US011454285B2

(12) United States Patent
Arnault et al.

(10) Patent No.: US 11,454,285 B2
(45) Date of Patent: Sep. 27, 2022

(54) COMBINED INSULATOR AND CONDUCTOR ASSEMBLY FOR BEARINGS WITH CLIP-MOUNTED CONDUCTOR

(71) Applicant: AKTIEBOLAGET SKF, Gothenburg (SE)

(72) Inventors: Benoit Arnault, Saint-Cyr-sur-Loire (FR); Nicolas Berruet, Artannes sur Indre (FR); Paul Feliciano, Saint Cyr-sur-Loire (FR); Mathieu Hubert, Turin (IT); Tommy Jullien, Ambillou (FR); Gene A Kovacs, Brighton, MI (US); Thomas Perrotin, Saint Roch (FR); Dave Christopher Rybski, White Lake, MI (US); Anthony Simonin, Tours (FR); Collin Snyder, Northville, MI (US)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 17/329,353

(22) Filed: May 25, 2021

(65) Prior Publication Data

US 2021/0364040 A1 Nov. 25, 2021

(30) Foreign Application Priority Data

May 25, 2020 (IT) .......................... 102020000012145

(51) Int. Cl.
*F16C 41/00* (2006.01)
*F16C 19/52* (2006.01)
(Continued)

(52) U.S. Cl.
CPC ............ *F16C 41/002* (2013.01); *F16C 19/52* (2013.01); *F16C 35/077* (2013.01)

(58) Field of Classification Search
CPC ...... F16C 19/52; F16C 35/077; F16C 41/002; F16C 2202/24; F16C 2202/32;
(Continued)

(56) References Cited

U.S. PATENT DOCUMENTS 4,801,270 A * 1/1989 Scarlata ................ F16C 41/002
439/95
5,735,615 A * 4/1998 Pontzer .................... F16C 35/00
384/476
(Continued)

FOREIGN PATENT DOCUMENTS

DE 202014105015 U1 10/2014
DE 102017106695 B3 4/2018
(Continued)

*Primary Examiner* — Alan B Waits
(74) *Attorney, Agent, or Firm* — J-Tek Law PLLC; Scott T. Wakeman; Mark A Ussai (57) ABSTRACT

A combined electrical insulator and conductor assembly for a bearing disposable between a shaft and a housing. An annular insulator is disposeable about the bearing and configured to prevent electric current flow between an outer ring and the housing. An electrical conductor has retainer(s) releasably engaged with the insulator so as to couple the conductor with the bearing, an outer radial end and an inner radial end. The conductor outer radial end, or/and a portion of the conductor between the outer and inner ends, is conductively engageable with the housing and the conductor inner radial end is conductively engageable with the shaft so as to provide an electrically conductive path between the shaft and the housing. Preferably, the conductor includes a conductive disk having arcuate retainer clips engageable with an insulator groove of the insulator and a brush subassembly including conductive fibers engaged with the shaft outer surface.

20 Claims, 9 Drawing Sheets

(51) Int. Cl.
*F16C 35/07* (2006.01)
*F16C 35/077* (2006.01)

(58) Field of Classification Search
CPC ........ H02K 5/145; H02K 5/173; H02K 11/40; H02K 13/10; H01R 39/39; H01R 39/643; H01R 4/64
See application file for complete search history.

(56) References Cited

U.S. PATENT DOCUMENTS

| | | | |
|---|---|---|---|
| 7,528,513 | B2 | 5/2009 | Oh |
| 9,581,203 | B2 | 2/2017 | White et al. |
| 10,050,490 | B1 | 8/2018 | Hubert et al. |
| 10,253,818 | B1 | 4/2019 | Ince et al. |
| 10,422,384 | B2 | 9/2019 | Hubert et al. |
| 10,931,179 | B2 | 2/2021 | Hubert et al. |
| 10,941,809 | B2 | 3/2021 | Colton et al. |
| 11,204,066 | B2 | 12/2021 | Feliciano et al. |
| 2003/0086630 | A1* | 5/2003 | Bramel ................ H02K 11/40 384/476 |
| 2005/0265643 | A1 | 12/2005 | Alsina et al. |
| 2014/0131512 | A1 | 5/2014 | Gyuricsko |
| 2016/0312834 | A1* | 10/2016 | White ................ F16C 33/586 |
| 2019/0226526 | A1 | 7/2019 | Hubert et al. |
| 2019/0296617 | A1 | 9/2019 | Hubert et al. |
| 2020/0224719 | A1 | 7/2020 | Colton et al. |
| 2021/0310517 | A1 | 10/2021 | Berruet et al. |
| 2021/0310518 | A1 | 10/2021 | Berruet et al. |
| 2021/0310520 | A1 | 10/2021 | Arnault et al. |
| 2021/0364041 | A1 | 11/2021 | Berruet et al. |

FOREIGN PATENT DOCUMENTS

| | | |
|---|---|---|
| DE | 102019200397 A1 | 7/2019 |
| FR | 1325720 A | 5/1963 |
| JP | 2015095440 A | 5/2015 |
| WO | 2016171929 A1 | 10/2016 |

* cited by examiner

COMBINED INSULATOR AND CONDUCTOR ASSEMBLY FOR BEARINGS WITH CLIP-MOUNTED CONDUCTOR

CROSS-REFERENCE

This application claims priority to Italian Patent Application No. 102020000012145, filed May 25, 2020, the entire contents of which are fully incorporated herein by reference.

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current and thereby prevent such current from passing through the bearing. These devices often include a plurality of conductive fibers spaced circumferentially about the entire outer surface of the shaft to form a relatively solid ring of fibers, such that current passes through the fibers between the shaft and the housing. Other devices or mechanisms are provided to electrically insulate the bearing in order to prevent current from passing through the bearing and may include insulative coatings or coverings.

SUMMARY OF THE INVENTION

In one aspect, the present invention is a combination electrical insulator and conductor assembly for a bearing disposable between a shaft and a housing, the bearing having an inner ring, an outer ring having an outer circumferential surface and opposing first and second axial ends, and a plurality of rolling elements between the rings, the housing having an inner circumferential surface. The assembly comprises an annular insulator disposeable about the outer ring and configured to prevent electric current flow between the outer ring and the housing. An electrical conductor has at least one retainer releasably engaged with the insulator so as to couple the conductor with the bearing, an outer radial end and an inner radial end. The conductor outer radial end or/and a portion of the conductor between the outer and inner ends is conductively engageable with the housing and the conductor inner radial end is conductively engageable with the shaft so as to provide an electrically conductive path between the shaft and the housing.

Preferably, the conductor includes an electrically conductive disk coupled with the insulator so as to be axially adjacent to the bearing. The disk has a centerline, an outer radial end engageable with the housing inner surface, an inner radial end defining a central opening for receiving a portion of the shaft and at least one and preferably a plurality of arcuate clips providing the at least one retainer. Each clip is engaged with an annular groove of the insulator to releasably couple the disk with the bearing. An annular conductive brush subassembly is coupled with the conductive disk and includes a centerline and a plurality of electrically conductive fibers, the conductive fibers being spaced circumferentially about the centerline and extending radially inwardly from the inner end of the conductive disk. Each conductive fiber has an inner end contactable with the shaft outer surface so as to provide a conductive path between the shaft and the disk.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a combined electrical insulator and conductor assembly 10 for a bearing 1 disposable between a shaft 2 rotatable about a central axis $A_C$ and a housing 3. The bearing 1 has an inner ring 4, an outer ring 5 with opposing first and second axial ends 5a, 5b, respectively, and an outer surface 5c, and a plurality of rolling elements 6 disposed between the rings 4 and 5. The shaft 2 has an outer circumferential surface 2a, which is provided by the shaft 2 itself or by a sleeve or other component (none shown) installed on the shaft 2, and at least the surface 2a, preferably the entire shaft 2 and/or sleeve/component, is electrically conductive. Also, the housing 3 has an inner circumferential surface 3a defining a bore 7, which may be a surface of the main housing 3 itself or an annular component disposed within the housing 3. Preferably, the bearing 1, the shaft 2 and the housing 3 are components of a motor or other electrical machine (e.g., a generator) or any other machine having rotating components likely to accumulate electric charge or convey electric current. Basically, the combined insulator and conductor assembly 10 comprises an annular insulator 12 disposeable about the bearing outer ring 5 and an electrical conductor 14 with at least one retainer 16 releasably engaged with the insulator 12 so as to couple the conductor 14 with the bearing 1.

Specifically, the insulator 12 is generally tubular or cylindrical, has a centerline 13 and preferably an annular groove 18 extending circumferentially about the centerline 13, and is configured to prevent electric current flow between the bearing outer ring 5 and the housing 3 and between the ring 5 and the conductor 14, and thus through the bearing 1. That is, the insulator 12 is either formed of an electrically insulative material or has one or more electrically insulative layers, as discussed below. The conductor 14 has a centerline 15 (coaxial with the insulator centerline 13), an outer radial end 14a and an inner radial end 14b, the at least one retainer 16 preferably being disposed at and providing the conductor outer radial end 14a. Preferably, the conductor 14 has a plurality of the retainers 16 each disposed at the outer radial end 14a and spaced circumferentially about the centerline 15, with each retainer 16 being conductively engageable with the housing inner surface 3a to provide a separate conductive path between the remainder of the conductor 14 and the housing 3.

Alternatively or additionally, a portion of the conductor 14 between the outer and inner radial ends 14a, 14b, respectively, is conductively engageable with the housing 3, such as through contact with a radial shoulder 3b (FIG. 10) of the housing 3 or a component 7 (FIG. 10) of the machine (e.g., a spring, a pin, etc.). As used herein, the term "conductively engageable" means establishing an electrically conductive path through direct contact or through contact with one or more intermediate components or members so as to enable electric current to flow between the engaged members, in particular the conductor 14 and the housing 3. Further, each retainer 16 preferably includes an arcuate clip 20 having a first leg portion 22 connected with a remainder of the conductor 14 and a second leg portion 24 deflectable with respect to the first leg portion 22 and having a free end 24a disposed within the insulator annular groove 18, as discussed below.

When the combined insulator/conductor assembly 10 is mounted on a bearing 1, which is subsequently installed between a shaft 2 and a housing 3, the outer radial end 14a of the conductor 14 is preferably conductively engaged with the housing 3, preferably the inner surface 3a and most preferably through engagement of the plurality of retainers 16 as discussed above, and/or an intermediate portion of the conductor 14 is so engaged as discussed above. The inner radial end 14b of the conductor 14 is conductively engaged with the shaft outer surface 2a, preferably through a preferred plurality of conductive fibers 26 as described in further detail below. As such, the conductor 14 provides an electrically conductive path between the shaft 2 and the housing 3 and functions to shunt current or charge on the shaft 2 away from the bearing 1. Thus, the combination insulator and conductor assembly 10 serves the purpose of protecting the bearing 1 both by preventing direct current flow through the bearing 1 (i.e., due to the insulator 12) and by providing an alternative path for current adjacent to the bearing 1 by means of the conductor 14. Having described the basic structure and functions above, these and other components of the assembly are discussed in detail below.

Still referring now to FIGS. 1-10, the insulator 12 preferably includes an insulative ring 30 coupled with the first axial end 5a of the bearing outer ring 5, preferably molded thereto as described below, and providing the coupling groove 18 and a tubular insulator body 32 disposed about the outer ring 5 and coupled with the insulative ring 30. The insulative ring 30 is formed of an insulative material, preferably glass-filled Nylon and most preferably PA66-GF35, but may be formed of any other appropriate material.

Referring now to FIGS. 4-10, the insulative ring 30 is generally circular and has an inner axial end 30a disposed against the bearing outer ring first axial end 5a, an opposing outer axial end 30b, and an inner circumferential surface 34 defining a bore 30c. Further, the ring 30 also has a first outer circumferential surface section 36 generally flush with the outer ring outer surface 5c, a second, radially-larger outer circumferential surface section 38, and a radial stop surface 37 extending between the first and second circumferential surface sections 36, 38. A plurality of arcuate projections 39 (FIG. 8) extend radially outwardly from the first outer surface section 36 and are disposed adjacent to the inner axial end 30a, each projection 39 being disposeable within a groove 42 of the tubular body 32, as described below. Further, the annular groove 18 preferably extends radially inwardly from the second outer surface section 38 as shown in the drawings, but may alternatively extend radially outwardly from the inner circumferential surface 34 (structure not depicted). Also, the ring 30 further has a chamfer 30d extending between the outer axial end 30b and the second outer surface section 38.

Still referring to FIGS. 4-10, the tubular insulator body 32 is generally circular cylindrical and has opposing inner and outer circumferential surfaces 33, 35, respectively, and opposing first and second axial ends 32a, 32b, respectively. The insulator body 32 is preferably formed of aluminum and has at least one layer of oxidation formed on either or both of the circumferential surfaces 33, 35, preferably formed by anodization, but may alternatively be formed of an appropriate insulative material (e.g., a rigid polymer or a ceramic) or another anodized metallic material. The inner circumferential surface 33 of the body 32 is disposeable about the outer surface 5c of the bearing outer ring 5 and the outer circumferential surface 35 is preferably frictionally engageable with the housing inner surface 3a to axially retain the bearing 1 and the assembly 10, but the outer surface 35 may be merely disposed against/within the housing inner surface 3a without frictional engagement.

Further, the tubular body 32 has a radial flange 40 extending inwardly from the body second axial end 30b and disposeable against the outer ring second axial end 5b. The body 32 is sized such that the first axial end 32a is spaced axially outwardly from the outer ring first axial end 5a when installed on the outer ring 5, such that a portion 33a of the inner surface 33 extends beyond the outer ring first end 5a. An annular groove 42 extends radially outwardly from the inner surface 33 and is located adjacent to the outer ring first axial end 5a. When the insulator 12 is installed about the bearing outer ring 5, the portion 33a of the tubular body inner surface 33 is disposed about the first outer surface section 36 of the ring 30, the tubular body first axial end 32a is disposed against the ring radial stop surface 37 and the plurality of ring projections 39 are disposed within the tubular body annular groove 42.

Figure 1:
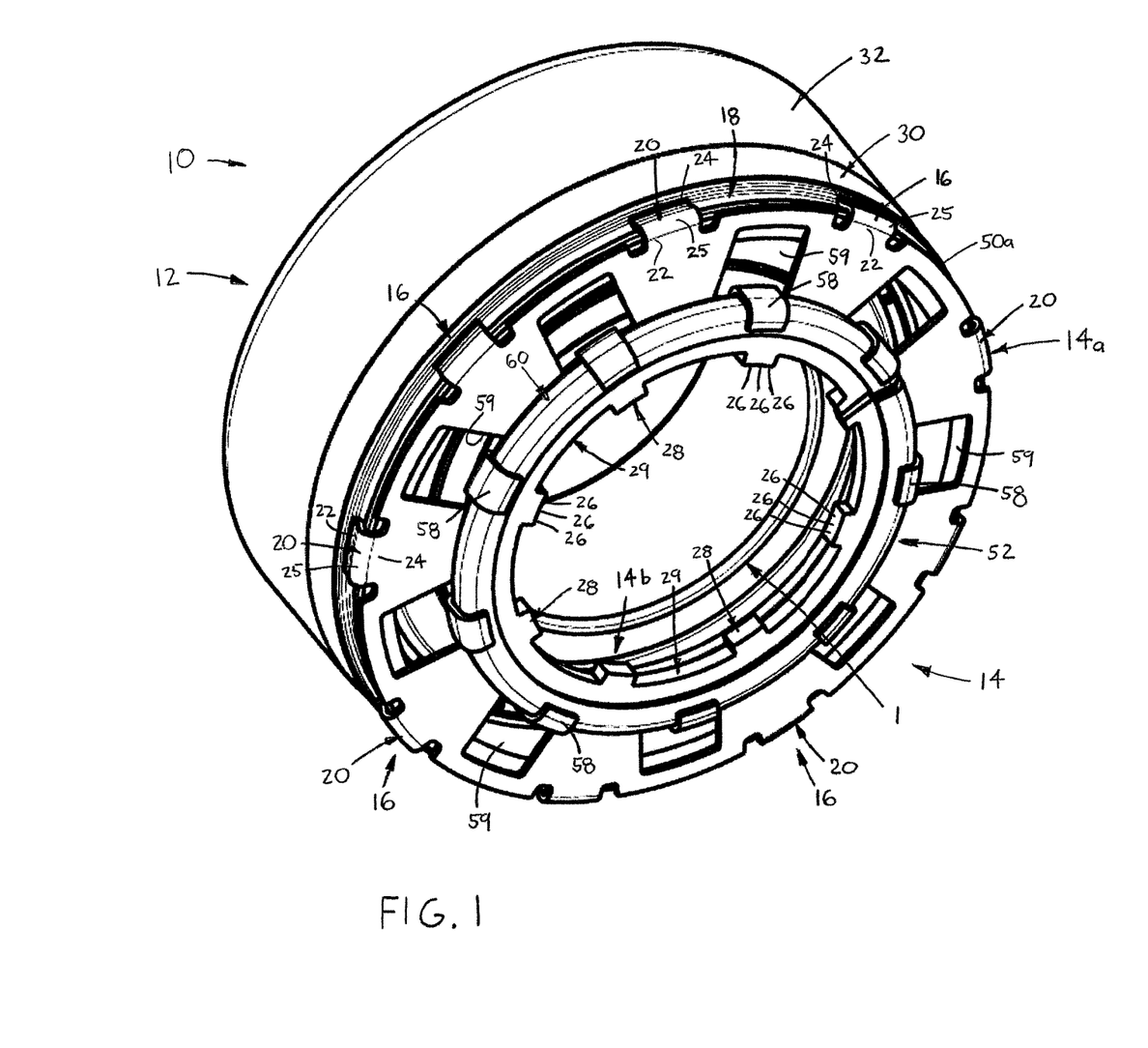
FIG. 1 is a perspective view of a combination insulator and conductor assembly in accordance with the present invention, shown installed on a bearing.
Figure 2:
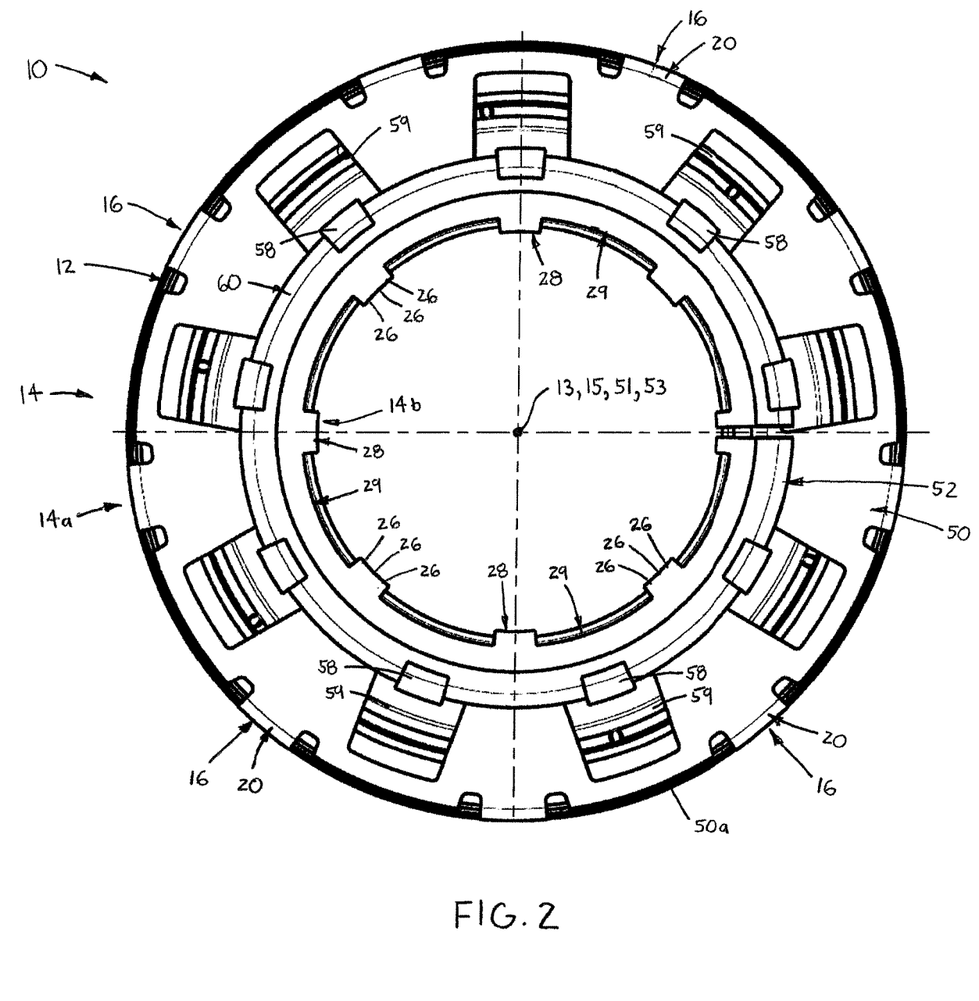
FIG. 2 is a front plan view of the combination insulator and conductor assembly.
Figure 3:
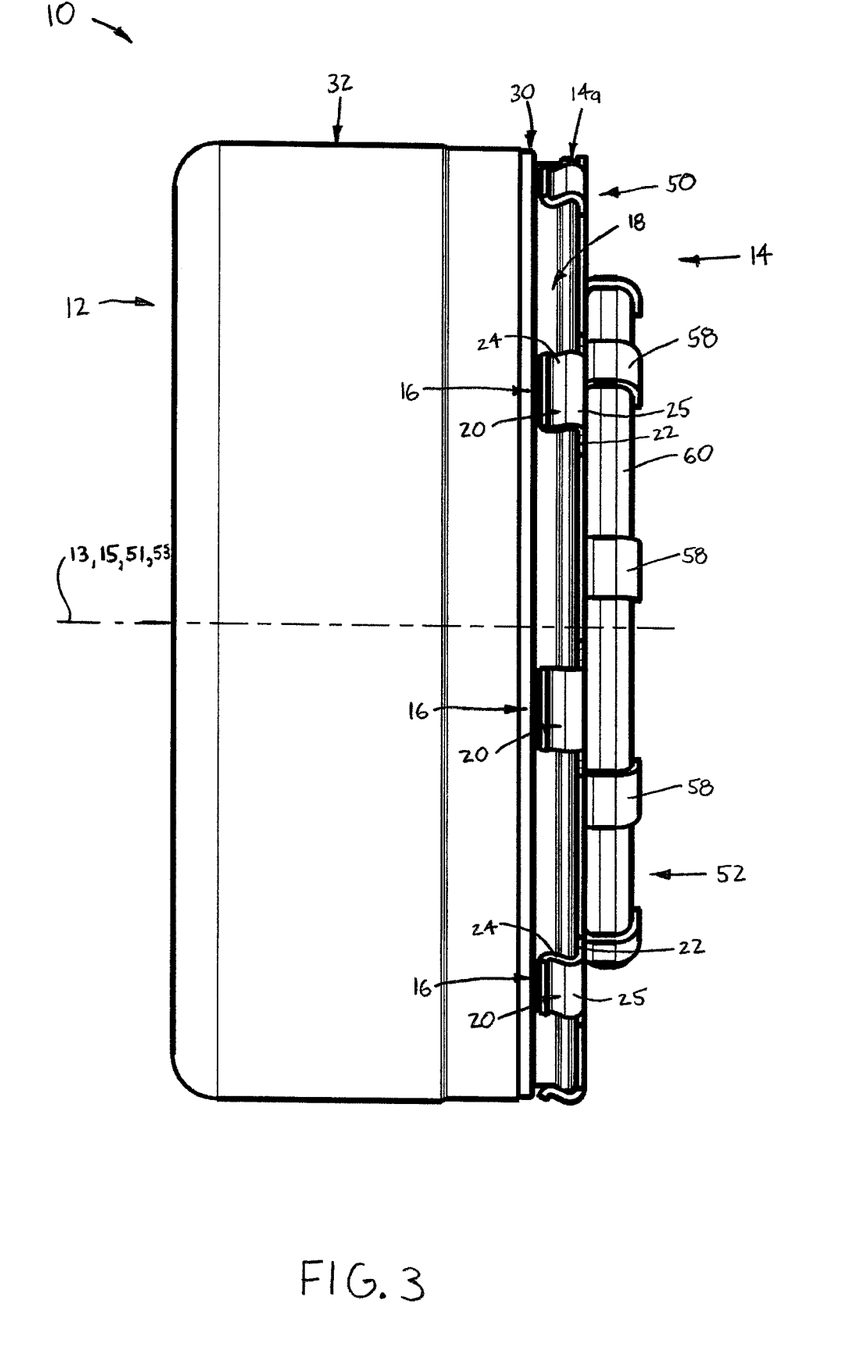
FIG. 3 is a side plan view of the combination insulator and conductor assembly.
Figure 4:
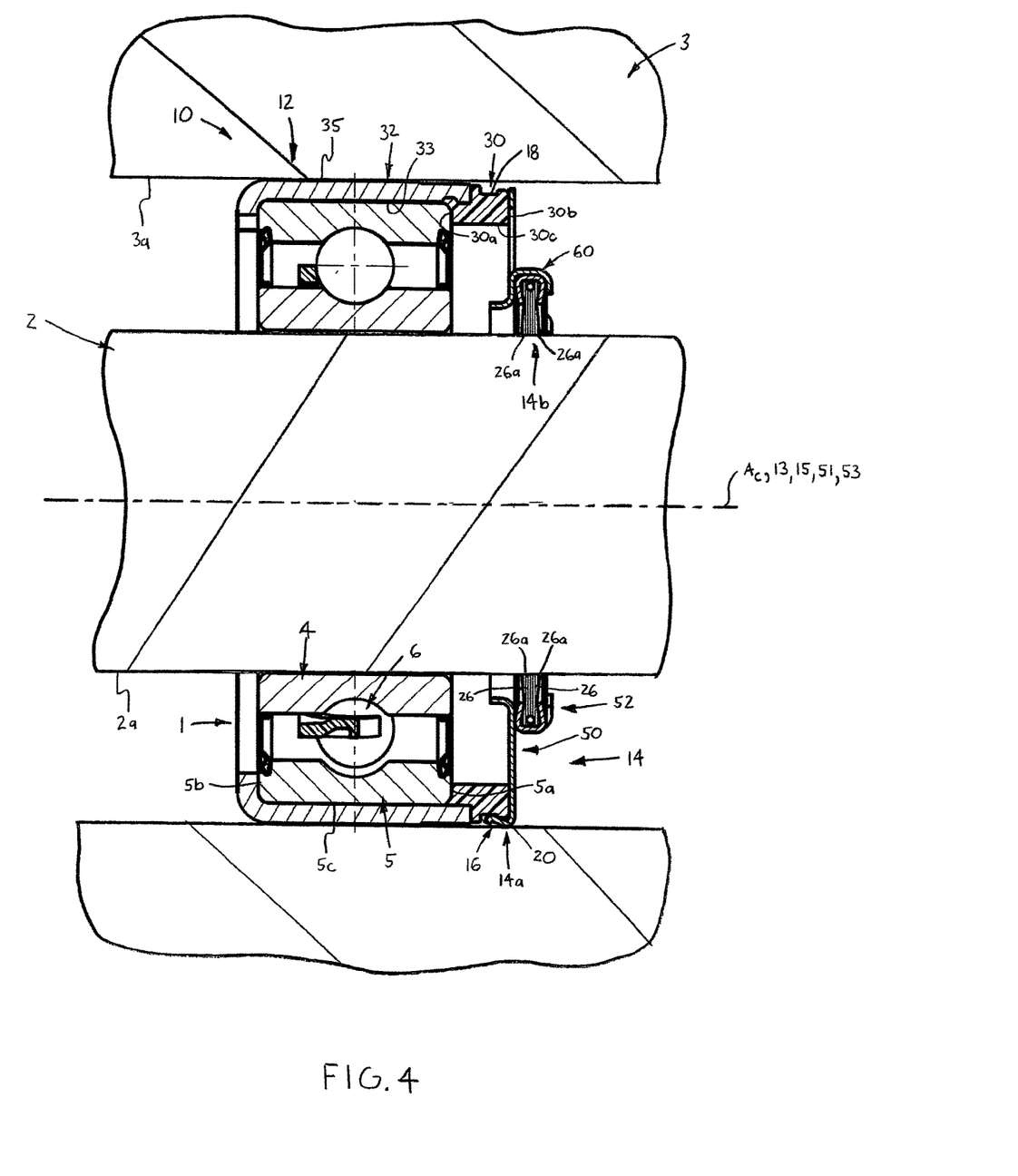
FIG. 4 is an axial cross-sectional view of the combination insulator and conductor assembly, shown installed on a shaft and within a housing.
Figure 5:
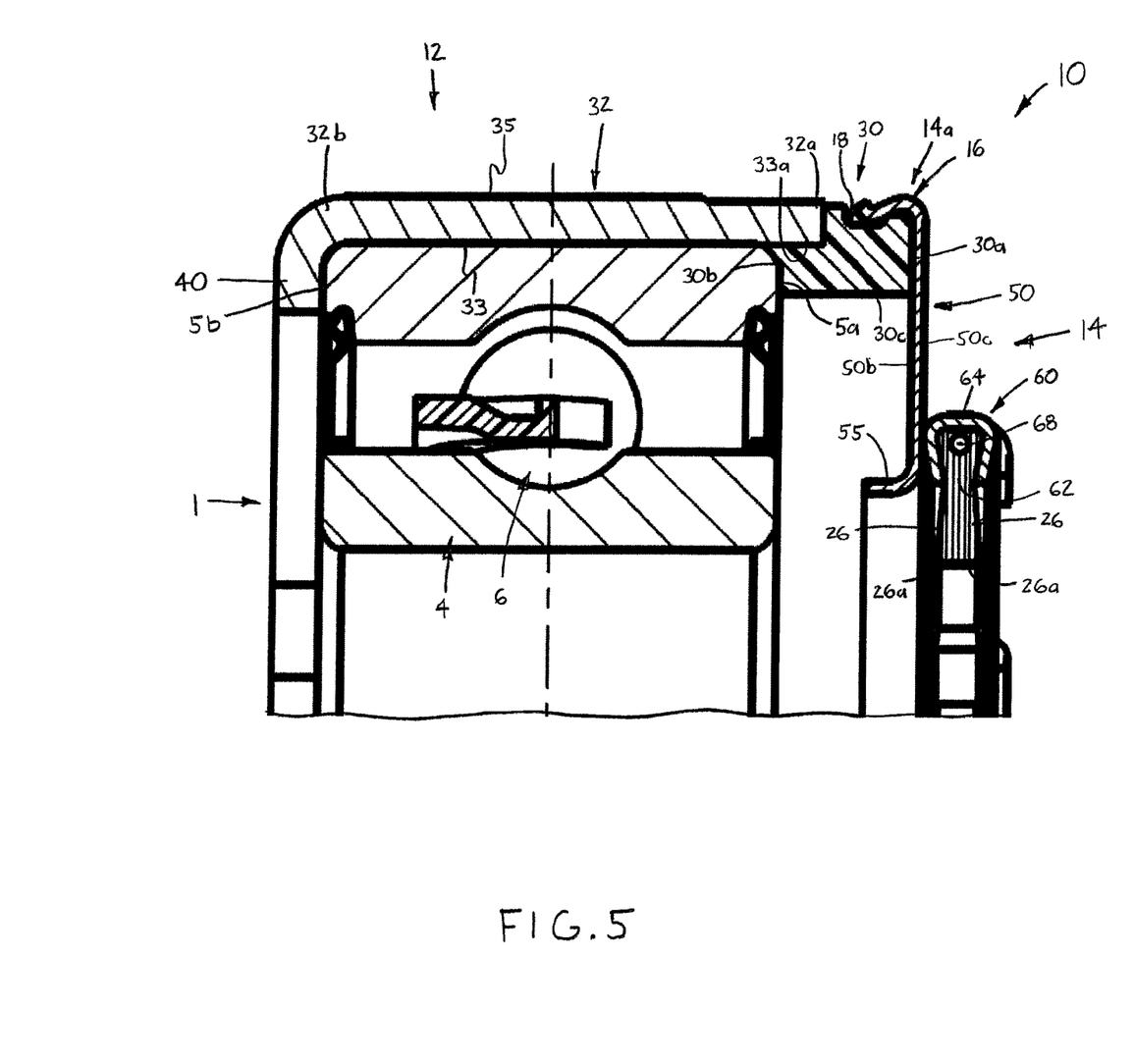
FIG. 5 is a broken-away, enlarged axial cross-sectional view of a portion of the combination insulator and conductor assembly taken through a retainer of the conductor.
Figure 8:
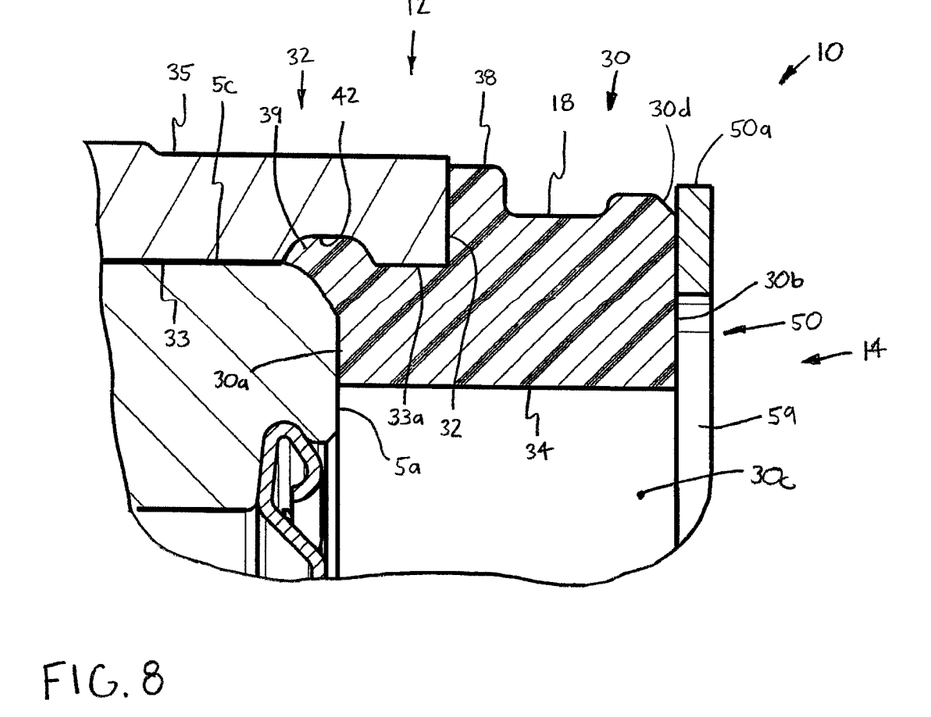
FIG. 8 is a broken-away, more enlarged view of an upper portion of FIG. 4.

Referring to FIGS. 5 and 8, with the above structure, the preferred two-piece insulator 12 is installed about of bearing outer ring 5 in the following manner. The insulator body 32 is first installed about the bearing outer ring 5 by inserting the bearing second axial end 5b into the first axial end 32a of the tubular body 32, and then sliding the body inner surface 33 about the ring outer surface 5c until the flange 40 is abutted against the ring second end 5b and the insulator body first axial end 32a is spaced from the bearing ring first axial end 5a. Then, the insulative ring 30 is installed on the bearing outer ring 5 by inserting the ring inner axial end 30a into the tubular body first axial end 32a until the insulative ring inner axial end 30a abuts against the bearing ring first axial end 5a. At this point, the insulative ring projections 39 (FIG. 8) become disposed within the tubular body groove 42 and the tubular body first end 32a abuts against the ring stop surface 37. Preferably, the insulative ring 30 is then molded (e.g., by application of heat) to the bearing outer ring 5 to fixedly retain the insulator 12 about the bearing 1.

Referring again to FIGS. 1-10, the conductor 14 preferably includes an electrically conductive disk 50 coupled with the insulator 12 (i.e., through the retainer(s) 16) so as to be axially adjacent to the bearing 1 and a brush subassembly 52 coupled with the disk 50 and providing the plurality of conductive fibers 26 contactable with the shaft 2, as discussed above. More specifically, the conductive disk 50 has a centerline 51, an outer radial end 50a providing the retainers 16, an inner radial end 50b defining a central opening 54 for receiving a portion of the shaft 2 and opposing first and second axial ends 50c, 50d, respectively. Further, the conductive brush subassembly 52 has a centerline 53 and the conductive fibers 26 are spaced circumferentially about the centerline 53 and extend radially inwardly from the inner end 50b of the conductive disk 50. Each conductive fiber 26 is preferably formed of carbon and has an inner end 26a contactable with the shaft outer surface 2a so as to provide a conductive path between the shaft 2 and the disk 50. As the disk 50 is configured to provide a conductive path between the brush subassembly 52 and the housing 3, any current or charge on the shaft 2 is directed to flow through the assembly 10, rather than through the bearing 1.

More specifically, the conductive disk 50 is generally circular and is preferably formed of a conductive metallic material, most preferably aluminum but may be formed of any other appropriate material (e.g., low carbon steel). The retainers 16 are preferably provided by a plurality of integral arcuate portions (not indicated) of the conductive disk 50 extending outwardly from the disk outer end 50a and generally axially from the second axial end 50d. The arcuate portions are each bended to form one clip 20 having the first and second leg portions 22, 24 joined by a central hinge portion 25, the second leg portion 24 being deflectable generally radially outwardly about the hinge portion 25 when installing the conductor 14 on the insulator 12, as described below. Preferably, the disk 50 has a circular flange 55 extending axially from the disk inner radial end 50b and away from the second axial end 50d, and thus toward the bearing 1. Further, the conductive disk 50 also preferably includes a plurality of mounting tabs 58 spaced circumferentially about the centerline 51, each mounting tab 58 being engaged with the brush subassembly 52 to couple the subassembly 52 with the disk 50.

Preferably, the conductive disk 50 is formed of a stamped metallic material, preferably aluminum as discussed above, which has first been die cut to form the central opening 54 defining the inner end 50b, the plurality of retainer portions spaced about the outer end 50a, and a plurality of rectangular tabs 58 and adjacent clearance holes 59. The clearance holes 59 provide passages for fluids (e.g., lubricants, air, etc.) to flow through the conductive disk 50 so as to pass to and from the bearing 1. Then, in a subsequent forming operation, the outer arcuate portions are bended to fabricate the clips 20 and the tabs 58 are bended about a retainer 60 (described below) of the brush subassembly 52, such that each engaged mounting tab 58 is generally C-shaped.

Figure 7:
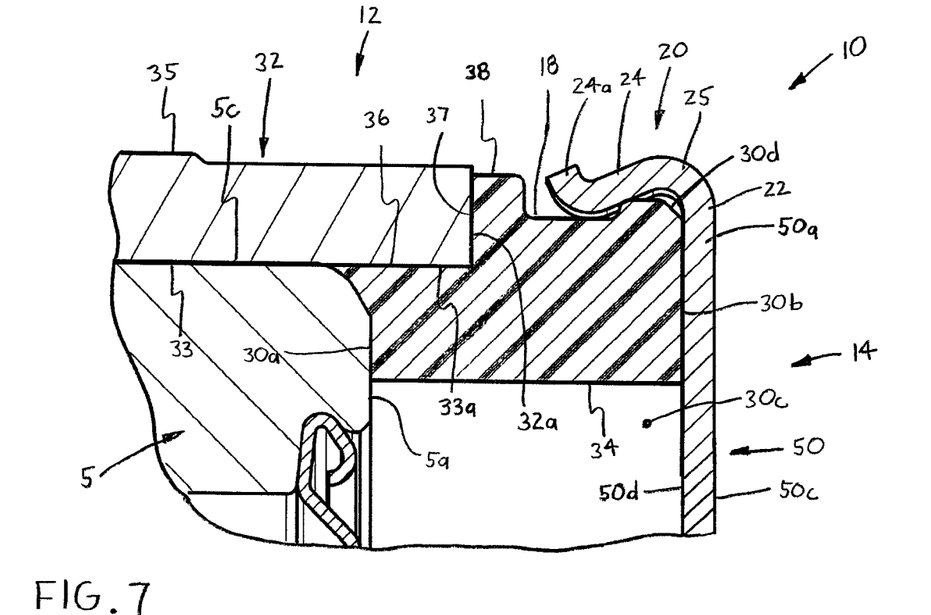
FIG. 7 is an even more enlarged view of a portion of FIG. 6.
Figure 9:
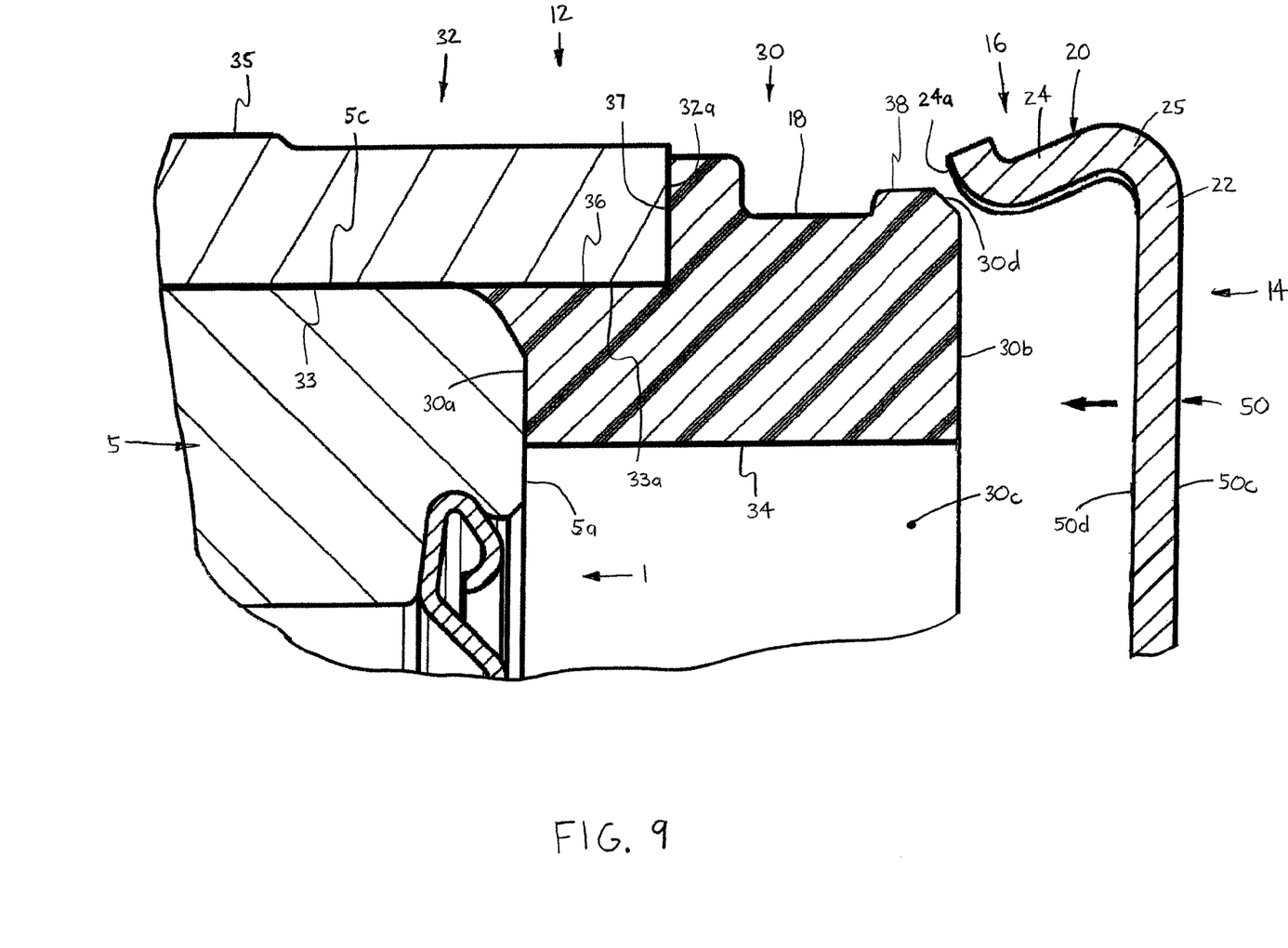
FIG. 9 is a broken-away, enlarged view of the portion of the assembly of FIG. 7, showing the conductor separate from the insulator during an installation process.

Referring to FIGS. 7 and 9, the conductive disk 50 is coupled with the insulator 12 by displacing the disk 50 axially toward the insulator 12 installed on the bearing 1 until the free end 24a of each retainer clip second leg portion 24 contacts the chamfer 30d of the insulator ring 30. As the disk 50 is advanced further toward the bearing 1, the second leg portion 24 of each clip 20 bends about the hinge portion 25 to displace radially outwardly as the free end 24a slides along the chamfer 30d, and then slides axially along a portion of the ring second outer surface section 38 until "snapping" inwardly into the groove 18. At this point, the conductor 14 is releasably or removably coupled with the insulator 12. Thereafter, the conductor 14 may be removed from the insulator 12 (and thus the bearing 1) by pulling the disk 50 away from the insulator 12 to disengage the retainer clips 20 from the groove 18 and then off of the insulator ring 30.

Figure 6:
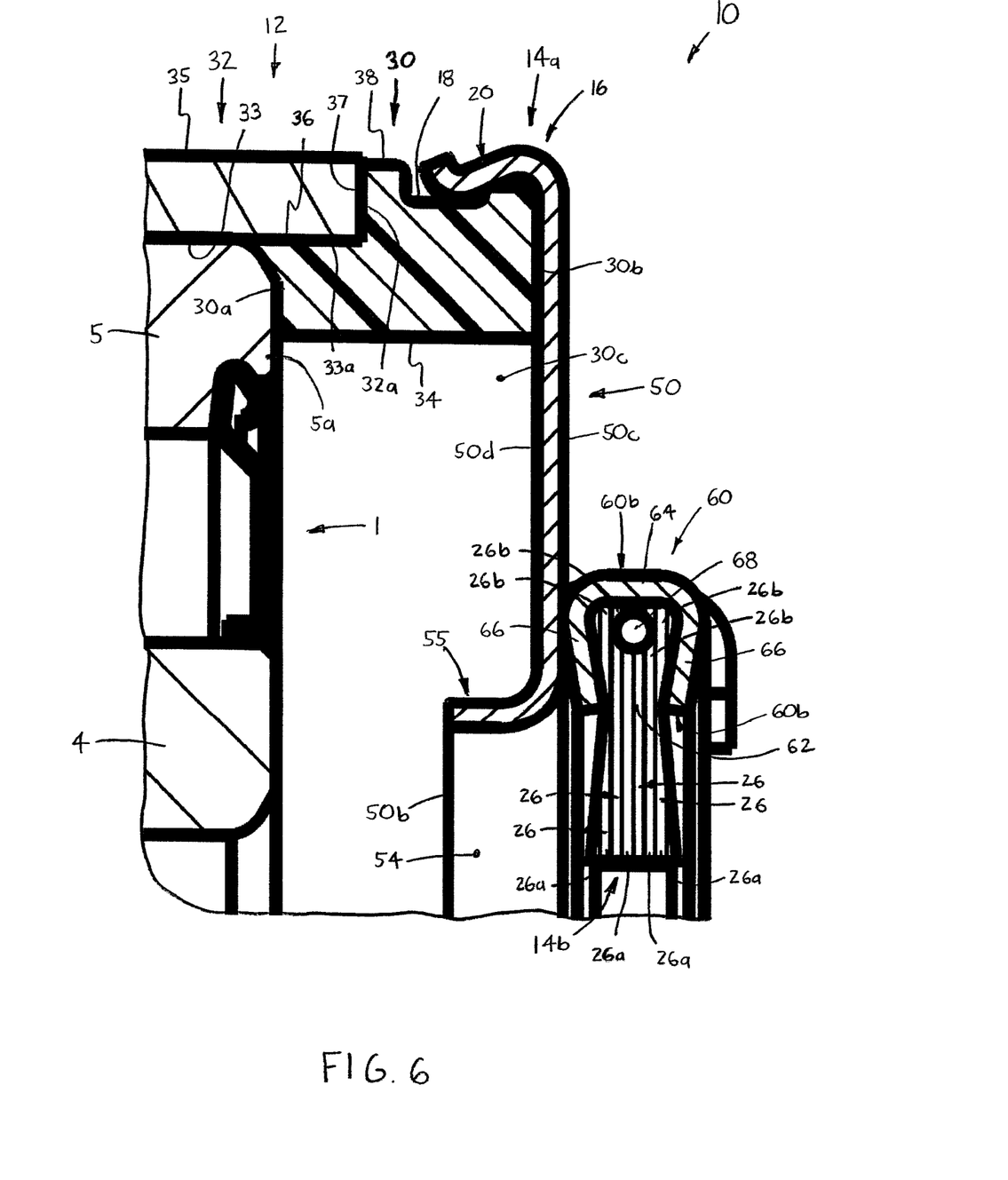
FIG. 6 is a broken-away, more enlarged view of an upper portion of FIG. 5.

Referring now to FIGS. 1, 2, 4-6 and 10, the conductive brush subassembly 52 preferably includes the annular retainer 60 connected with the conductive disk 50, as described above. As best shown in FIG. 6, the annular retainer 60 has an open inner radial end 60a with an annular groove 62 and a closed outer end 60b. Each one of the plurality of conductive fibers 26 has an outer radial end 26b disposed within the groove 62 and extends radially inwardly from the retainer 60 and toward the shaft 2. More specifically, the retainer 60 has an outer axial base 64 and two opposing radial legs 66, such that retainer 60 has generally C-shaped axial cross-sections. The retainer legs 66 preferably clamp against the outer ends 26b of the conductive fibers 26 to retain the fibers 26 within the groove 62.

Further, the brush subassembly 52 preferably includes a circular hoop 68 disposed within the retainer groove 62 and each one of the plurality of conductive fibers 26 is bended about the hoop 68. As such, each conductive fiber 26 is preferably generally U-shaped or V-shaped and has two inner ends 18a contactable with the shaft outer surface 2a. However, each one of the conductive fibers 26 may be arranged to extend as a generally straight strand (not shown) from the outer radial end 18b to the inner radial end 18a.

Furthermore, the plurality of conductive fibers 26 of the brush subassembly 52 are either arranged in a generally continuous ring of fibers (not shown) or preferably as a plurality of circumferentially spaced discrete sets 28 of fibers 26. In the latter preferred case, the sets 28 of fibers 26 are preferably formed by die-cutting a brush subassembly 52 including a continuous ring of fibers 26 such that the fiber sets 28 contactable with the shaft 2 are spaced apart by sets 29 of shorter length fibers 26. Also, each conductive fiber 26 is preferably sized having a diameter within the range of five micrometers or microns (5 μm) to one hundred microns (100 μm). Although each conductive fiber 26 is preferably formed of carbon as discussed above, the fibers 26 may alternatively be fabricated of any appropriate electrically conductive material, such as a metallic material, a conductive polymer, etc.

Although the conductor 14 preferably includes the conductive disk 50 and the brush subassembly 52 as described above and depicted in the drawing figures, the conductor 14 may alternatively be formed in any other appropriate manner that is both coupleable with the insulator 12 and capable of providing one or more conductive paths between the shaft 2 and the housing 3. For example, the conductor 14 may include, instead of the brush subassembly 52, a solid ring of a conductive material (not shown) attached to the conductive disk 50 and conductively engageable with the shaft 2, the ring having either a continuous inner circumferential contact surface or a plurality of arcuate contact surface sections provided by radially-inwardly extending projections. As a further alternative, the conductive disk 50 may be formed having an inner end 50*b* contactable with the shaft outer surface 2*a* to provide a direct conductive path between the shaft 2 and the disk 14. The scope of the present invention encompasses these and all other appropriate constructions of the conductor 14 capable of functioning generally as described herein.

The present insulator/conductor assembly 10 is more effective at protecting a bearing 1 from damage caused by electric current than previously known devices. The insulator 12 effectively prevents a voltage difference from being established between the shaft 2 and the housing 3 through the bearing 1, such that electric current is prevented from flowing through the inner and outer rings 4, 5 and the rolling elements 6. To further ensure that electric current will not pass through the bearing 1, the conductive disk 50 and the brush subassembly 52 provide an alternative path for any charge or current on the shaft 2 to pass through the conductive fibers 26 to the retainer 60, through the retainer 60 and into the conductive disk 50, then passing through the retainer clips 20 and into the housing 3.

Figure 10:
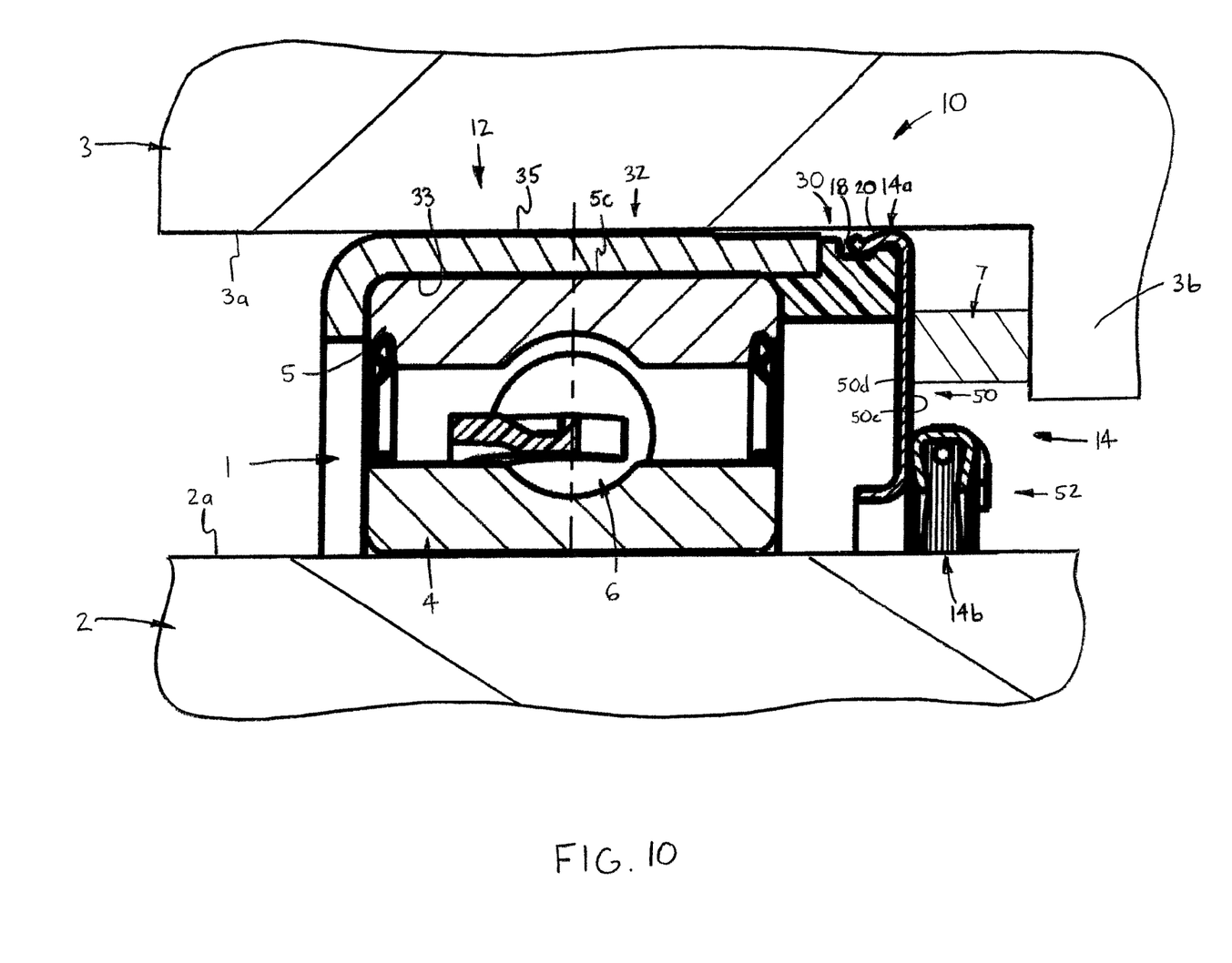
FIG. 10 is a broken-away, axial cross-sectional view of the combination insulator and conductor assembly shown installed in an alternative application.

Additional or alternative conductive paths into the housing 3 may be provided by axial contact between a portion of the housing 3 (e.g., a radial shoulder) or a component 7 of the machine disposed within the housing 3, such as a spring, a pin, etc., and either a surface of the conductive disk 50, as shown in FIG. 10, or/and of the annular retainer 60. Thus, any charge or current on the shaft 2 in the region of the bearing 1 is both prevented from passing through the bearing 1 by the insulator 12 and shunted to pass through the brush subassembly 52 and the conductive disk 50. Further, the assembly 10 may be installed on the bearing 1 by a manufacturer or a distributor, such that a bearing 1 with combined insulator and conductor assembly 10 may be provided to a customer or end user as an entire assembly ready to be installed on a shaft 2 and within a housing 3.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. The invention is not restricted to the above-described embodiments and may be varied within the scope of the following claims.

We claim:

1. A combined electrical insulator and conductor assembly for a bearing disposable between a shaft and a housing, the bearing having an inner ring, an outer ring having an outer circumferential surface and opposing first and second axial ends, and a plurality of rolling elements disposed between the rings, the shaft having an outer circumferential surface and the housing having an inner circumferential surface, the assembly comprising:
   an annular insulator disposeable about the outer ring and configured to prevent electric current flow between the outer ring and the housing; and
   an electrical conductor having at least one retainer releasably engaged with the insulator so as to couple the conductor with the bearing, an outer radial end and an inner radial end, at least one of the outer radial end and a portion of the conductor between the outer and inner ends being conductively engageable with the housing and the inner radial end being conductively engageable with the shaft so as to provide an electrically conductive path between the shaft and the housing.

2. The assembly as recited in claim 1 wherein the insulator has an annular groove and the at least one retainer includes an arcuate clip having a first leg portion connected with the conductor and a second leg portion deflectable with respect to the first leg portion and having a free end disposed with the insulator groove.

3. The assembly as recited in claim 1 wherein the conductor has a plurality of the retainers each disposed at the conductor outer radial end and spaced circumferentially about a centerline, each retainer being conductively engageable with the housing inner surface so as to provide a separate conductive path between the conductor and the housing.

4. The assembly as recited in claim 1 wherein the insulator includes:
   an insulative ring coupled with the first axial end of the bearing outer ring and formed of an electrically insulative material; and
   a tubular insulator body having an inner circumferential surface disposeable about the outer surface of the bearing outer ring and an outer circumferential surface engageable with the housing inner surface, a first axial end coupled with the insulative ring and an opposing second axial end, the insulator body being formed of an electrically insulative material or provided with an insulative layer on at least one of the inner and outer surfaces.

5. The assembly as recited in claim 4 wherein the tubular insulator body has an annular groove extending radially outwardly from the inner circumferential surface and disposed adjacent to the first axial end and the insulative ring has an annular shoulder extending radially outwardly from an outer circumferential surface and disposed within the insulator body groove to couple the ring with the insulator body.

6. The assembly as recited in claim 1 wherein the electrical conductor includes:
an electrically conductive disk having an outer radial end, the at least one retainer being connected with the disk outer end, and an inner radial end defining a central opening for receiving a portion of the shaft; and
an annular conductive brush subassembly coupled with the conductive disk and including a centerline and a plurality of electrically conductive fibers, the conductive fibers being spaced circumferentially about the centerline and extending radially inwardly from the inner end of the conductive disk, each conductive fiber having an inner end contactable with the shaft outer surface so as to provide a conductive path between the shaft and the disk.

7. The assembly as recited in claim 6 wherein the conductive disk has a centerline and further includes a plurality of mounting tabs spaced circumferentially about the centerline, each mounting tab being engaged with the brush subassembly to couple the brush subassembly with the conductive disk.

8. The assembly as recited in claim 6 wherein the conductive brush subassembly includes an annular retainer connected with the conductive disk and having an inner radial end with an annular groove, each one of the plurality of conductive fibers having an outer radial end disposed within the groove and extending radially inwardly from the retainer and toward the shaft.

9. The assembly as recited in claim 8 wherein the brush subassembly further includes a circular hoop disposed within the retainer and each one of the plurality of conductive fibers is bent about hoop such that each fiber has two ends contactable with the shaft outer surface.

10. The assembly as recited in claim 1 wherein the plurality of conductive fibers of the brush subassembly are arranged in a plurality of circumferentially spaced discrete sets of fibers.

11. A combined electrical insulator and conductor assembly for a bearing disposable between a shaft and a housing, the bearing having an inner ring, an outer ring having an outer circumferential surface and opposing first and second axial ends, and a plurality of rolling elements disposed between the rings, the shaft having an outer circumferential surface and the housing having an inner circumferential surface, the assembly comprising:
an annular insulator disposeable about the outer ring and configured to prevent electric current flow between the outer ring and the housing;
an electrically conductive disk having an outer radial end, an inner radial end defining a central opening for receiving a portion of the shaft, and at least one retainer disposed at the outer radial end and releasably engaged with the insulator so as to couple the disk with the bearing, at least one of the outer radial end and a portion of the disk between the outer and inner ends being conductively engageable with the housing; and
an annular conductive brush subassembly coupled with the conductive disk and including a centerline and a plurality of electrically conductive fibers, the conductive fibers being spaced circumferentially about the centerline and extending radially inwardly from the inner end of the conductive disk, each conductive fiber having an inner end contactable with the shaft outer surface so as to provide a conductive path between the shaft and the disk.

12. The assembly as recited in claim 11 wherein the insulator has an annular groove and the at least one retainer includes an arcuate clip having a first leg portion connected with the conductive disk and a second leg portion deflectable with respect to the first leg portion and having a free end disposed with the insulator groove.

13. The assembly as recited in claim 11 wherein the conductive disk has a plurality of the retainers each disposed at the conductor outer radial end and spaced circumferentially about the centerline, each retainer being conductively engageable with the housing inner surface so as to provide a separate conductive path between the conductor and the housing.

14. The assembly as recited in claim 11 wherein the insulator includes:
an insulative ring coupled with the first axial end of the bearing outer ring and formed of an electrically insulative material; and
a tubular insulator body having an inner circumferential surface disposeable about the outer surface of the bearing outer ring and an outer circumferential surface engageable with the housing inner surface, a first axial end coupled with the insulative ring and an opposing second axial end, the insulator body being formed of an electrically insulative material or provided with an insulative layer on at least one of the inner and outer surfaces.

15. The assembly as recited in claim 14 wherein the tubular insulator body has an annular groove extending radially outwardly from the inner circumferential surface and disposed adjacent to the first axial end and the insulative ring has an annular shoulder extending radially outwardly from an outer circumferential surface and disposed within the insulator body groove to couple the ring with the insulator body.

16. The assembly as recited in claim 11 wherein the conductive disk has a centerline and further includes a plurality of mounting tabs spaced circumferentially about the centerline, each mounting tab being engaged with the brush subassembly to couple the brush subassembly with the conductive disk.

17. The assembly as recited in claim 11 wherein the conductive brush subassembly includes an annular retainer connected with the conductive disk and having an inner radial end with an annular groove, each one of the plurality of conductive fibers having an outer radial end disposed within the groove and extending radially inwardly from the retainer and toward the shaft.

18. The assembly as recited in claim 17 wherein the brush subassembly further includes a circular hoop disposed within the retainer and each one of the plurality of conductive fibers is bent about hoop such that each fiber has two ends contactable with the shaft outer surface.

19. The assembly as recited in claim 11 wherein the plurality of conductive fibers of the brush subassembly are arranged in a plurality of circumferentially spaced discrete sets of fibers.

20. A combined electrical insulator and conductor assembly for a bearing disposable between a shaft and a housing, the bearing having an inner ring, an outer ring having an outer circumferential surface and opposing first and second axial ends, and a plurality of rolling elements disposed between the rings, the shaft having an outer circumferential surface and the housing having an inner circumferential surface, the assembly comprising:
an insulative ring coupled with the first axial end of the bearing outer ring and formed of an electrically insulative material;

a tubular insulator body having an inner circumferential surface disposeable about the outer surface of the bearing outer ring and an outer circumferential surface engageable with the housing inner surface, a first axial end coupled with the insulative ring and an opposing second axial end, the insulator body being formed of an electrically insulative material or provided with an insulative layer on at least one of the inner and outer surfaces; and an electrical conductor having at least one retainer releasably engaged with the tubular insulator body so as to couple the conductor with the bearing, an outer radial end and an inner radial end, at least one of the outer radial end and a portion of the conductor between the outer and inner ends being conductively engageable with the housing and the inner radial end being conductively engageable with the shaft so as to provide an electrically conductive path between the shaft and the housing.

* * * * *